US 6,559,947 B1

United States Patent
Turner

(12) United States Patent
(10) Patent No.: US 6,559,947 B1
(45) Date of Patent: May 6, 2003

(54) REFERENCE FRINGE COUNTING FOURIER TRANSFORM SPECTROSCOPY

(75) Inventor: Andrew J. Turner, Great Missenden (GB)

(73) Assignee: Wallesley International C.V. (CH)

( * ) Notice: Subject to any disclaimer, the term of this patent is extended or adjusted under 35 U.S.C. 154(b) by 0 days.

(21) Appl. No.: 09/383,241

(22) Filed: Aug. 26, 1999

(30) Foreign Application Priority Data

Aug. 28, 1998 (EP) .............................................. 98306955

(51) Int. Cl.[7] ................................................. G01B 9/02
(52) U.S. Cl. ...................................... 356/452; 356/451
(58) Field of Search ................................. 356/577–578, 356/451–452

(56) References Cited

U.S. PATENT DOCUMENTS 4,346,447 A * 8/1982 Takahama .............. 250/231.16
4,413,908 A * 11/1983 Abrams et al. ............. 318/640
4,684,255 A * 8/1987 Ford ........................... 356/455
5,245,406 A 9/1993 Masutani ..................... 356/346
RE37,560 E * 2/2002 Elings ........................ 250/306

FOREIGN PATENT DOCUMENTS

FR 2148420 3/1973
GB 2163548 2/1986

* cited by examiner

*Primary Examiner*—Frank G. Font
*Assistant Examiner*—Phil Natividad
(74) *Attorney, Agent, or Firm*—St. Onge Steward Johnston & Reens LLC

(57) ABSTRACT

Fringe counting in a Michelson type interferometer is carried out by detecting when the amplitude of the reference fringe attains a given value eg a zero crossing. Reversals in scan direction are recognized by monitoring parameters of the waveform such as amplitude and time occurence of successive half fringes and identifying a reversal by the occurrence of a particular sequence or state of the monitored parameters.

17 Claims, 6 Drawing Sheets

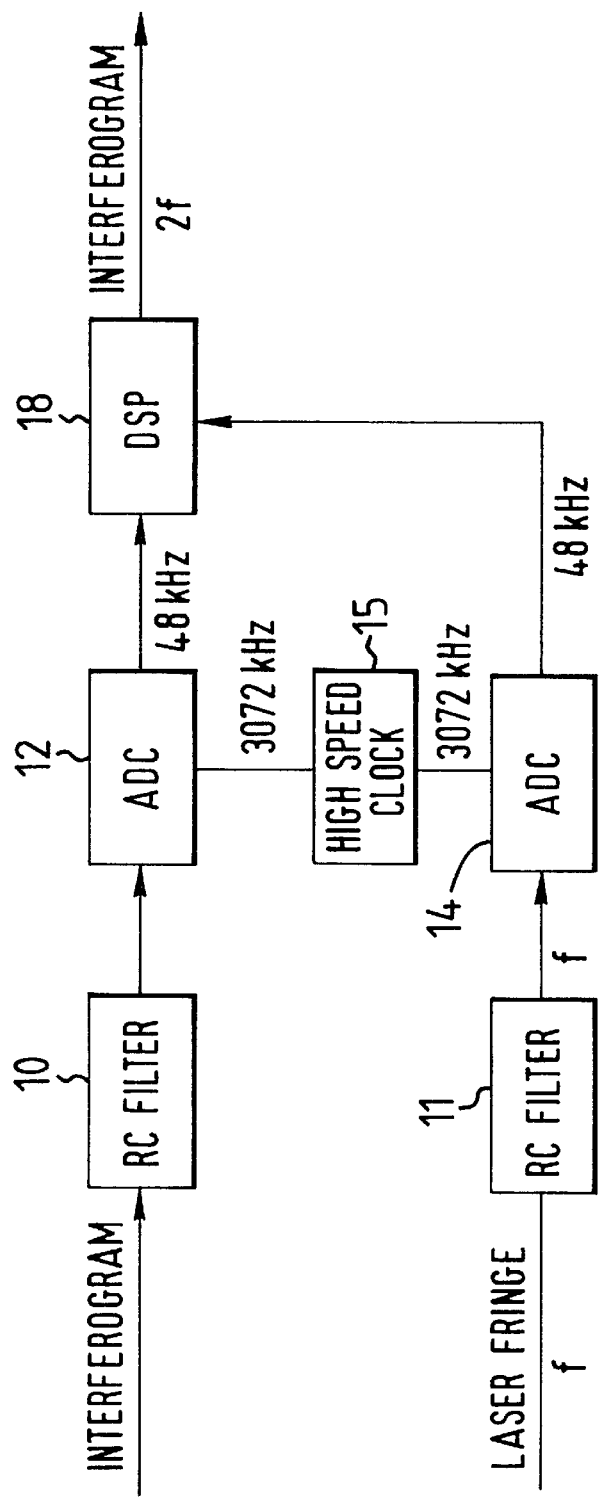
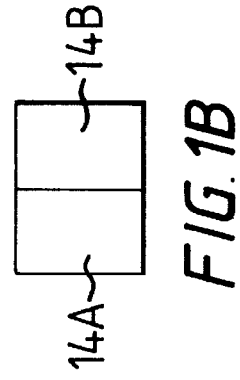

REFERENCE FRINGE COUNTING FOURIER TRANSFORM SPECTROSCOPY

FIELD OF THE INVENTION

This invention relates to infrared spectroscopy and in particular relates to FT-IR spectroscopy based upon a Michelson type interferometer.

BACKGROUND ART

In FT-IR spectroscopy an interferometer of the Michelson type splits an input light beam into a reflected beam and a transmitted beam by means of a beam splitter. Each split beam travels along its own path to a return mirror which deflects it back to the beam splitter along the same path. One of the return mirrors is stationary while the other is movable typically along a linear path between two limits equidistant from a datum position. At the beam splitter the return split beams recombine along a common output path leading to a photodetector via a sample station.

If the movable mirror is at its datum position the optical path of the two split beams is the same so that when those split beams return to the beam splitter they constructively interfere. This results in a large signal being produced at the photodetector and this is known as the centreburst. If the movable mirror is shifted towards the incoming split beam, the optical path of that beam decreases and conversely if it is moved away the optical path is increased. Thus, as the movable mirror is moved from one limit to another two complete series of optical path difference values of opposite signs are generated and this travel is referred to as an optical path difference (OPD) scan. The output signal of the photodetector during an OPD scan is a series of superposed electrical sine waves of different frequencies and amplitudes. This signal is known as an interferogram.

These interferometers also include a reference light source, typically a laser, which is used to measure the optical path difference. The reference fringes created during an OPD scan are sensed by a photodetector which generates a reference fringe signal which is a sine wave.

When no sample is present at the sample position the detector signal is the emission interferogram of the light source typically an infrared source. When a sample is present the output signal of the detector is the interferogram of the sample superimposed upon that of the light source. By taking the Fourier Transform of the source interferogram and the Fourier Transform of the sample interferogram superposed upon that of the source it is possible to obtain the spectrum of the sample.

In modern interferometers the interferograms are acquired and processed digitally in order to obtain the spectrum of a sample under investigation. It is known, for example, to feed the output of the photodetector to an analog-to-digital converter in order to produce a digital representation of the interferogram. The reference fringes from the laser can also be digitised in a similar way. One way in which this can be implemented is described in our co-pending European Patent Application No 96307360.6 (E-PA-0836083).

As referred to above the reference laser is used to determine changes in the optical path difference of the interferometer and hence to determine the optical path difference interval at which the interferogram is sampled by the analog-to-digital converter. The interferometer sinusoidally amplitude modulates the laser beam and one period of the sine wave corresponds to a change in optical path difference equal to the laser wavelength.

In carrying out an analysis of a sample an interferometer will execute a number of scans sweeping forward and backwards through the centreburst of the infrared interferogram generating a series of ADC readings during part of each scan. The length of each scan is determined by the required spectral resolution. The reference fringe is used to determine the exact times at which the data converter in the interferogram channel should be read in order to build up a sampled interferogram with constant optical path difference intervals. In practice changes in scan direction may occur at slightly different optical path difference values in different sweeps. Lack of detailed knowledge about where reversals occur in the fringe waveform will lead to some uncertainty in the absolute optical path difference of points read by the analog-to-digital converter in subsequent scans. In an ideal arrangement the exact OPD at which each data point is read should be known in each sequence of readings (i.e. each scan) and this is essential where interferograms are being co-added. A number of methods have been used in order to achieve this. If this is not done the position of the optical path difference could vary by perhaps a few microns between each scan and this can significantly affect the accuracy of co-added interferograms and consequently affect the quality of the transformed spectra.

One known way of achieving this requirement is to use a correlation algorithm. The first completed interferogram is centred around the maximum value of the data which is assumed to be the centreburst and subsequent completed scans are correlated against this in order to detect any data shift which gives the best correlation with the first (or accumulated) scan. This technique only works if the infrared interferogram has a reasonable signal-to-noise ratio and can fail with certain samples such as narrow pass band optical filters.

Another way of achieving the requirement is to use a method based on absolute counting. This involves continuous up/down counting of laser fringes with the optical path difference known exactly at all times after an initial calibration. The data acquisition is started on the same count value and hence the same OPD value for each sweep. A critical factor in this approach is the determination of the instant at which the scan mechanism changes direction and hence the need for a change in the direction of counting.

One known way of implementing absolute counting is to use an up/down counting system based on fringe quadrature. This involves providing extra optical components and circuitry to generate two reference fringes nominally 90° apart. Other known ways are to ensure that the reversal in direction occurs at a particular phase of the laser fringe, or to use phase modulation of the OPD drive.

SUMMARY OF THE INVENTION

The present invention is based upon the concept of representing the amplitude of the references fringes by a plurality of amplitude states and identifying a reversal in scan direction by the occurrence of a particular sequence or sequences of such states. One example in accordance with the invention uses an arrangement similar to the type described in the above-mentioned European Patent Application No 96307360.6 in which the reference fringe is sampled by an analog-to-digital converter at constant time intervals from which are determined the zero crossing points of the laser fringes, that is the time at which the fringe signal changes from a positive to a negative value or vice versa. From this fringe counting can be achieved. The present invention involves a technique for analysing the reference fringe data to identify characteristics which indicate the position of reversals of direction, and hence to provide the ability to achieve absolute up/down counting.

According to the present invention there is provided apparatus for processing the output signals of a Michelson type interferometer used in Fourier Transform spectroscopy which outputs include a waveform comprising an interferogram and a reference waveform representing interference fringes, said apparatus includes means for providing a digital representation of the interferogram waveform and means for providing a digital representation of the reference waveform and processing means for processing the digital representation of the reference waveform which processing includes monitoring parameters of the reference waveform signal and recognising a reversal of the scan direction by a change in said parameters. The monitoring may comprise monitoring the amplitude of each half fringe and a reversal is recognised by a failure of the fringe signal during a half cycle to attain a given percentage of the amplitude of preceding fringes. The monitoring may comprise monitoring the time occurrences of each half cycle and a reversal is recognised by a change in the interval between successive half ranges. In a preferred arrangement the reversal of scan direction is recognised by identifying either a failure of the fringe signal during a half cycle to obtain a given percentage of the amplitude of preceding fringes, or by recognising a change in the interval between successive half fringes. The digital representation of the reference fringe waveform may be generated by analog-to-digital converter sampled at constant time intervals. The digital signal processor can carry out fringe counting by counting said zero crossings of the reference waveform and change count direction when a reversal in scan direction is detected.

An alternative implementation uses a zero crossing detector and analog comparators to determine whether the fringe amplitude exceeds a set percentage of the peak fringe value during the previous half fringe of the reference waveform, and a microprocessor for timing analysis and counting.

Another aspect of the present invention provides a method of processing the output signals of a Michelson type interferometer which outputs include an interferogram and a reference waveform representing interference fringes, said method comprising providing a digital representation of the reference waveform and processing the digital representation using a digital signal processor said processing including monitoring selected parameters of the reference waveform and recognising a reversal of the scan direction by a change of said parameters.

BRIEF DESCRIPTION OF THE DRAWINGS

The invention will be described now by way of example only, with particular reference to the accompanying drawings. In the drawings:

FIG. 1 is a schematic block diagram of an apparatus for processing an interferogram signal such as that described in European Patent Application No 89307360.6.

DETAILED DESCRIPTION OF THE PREFERRED EMBODIMENT

Figure 2A:
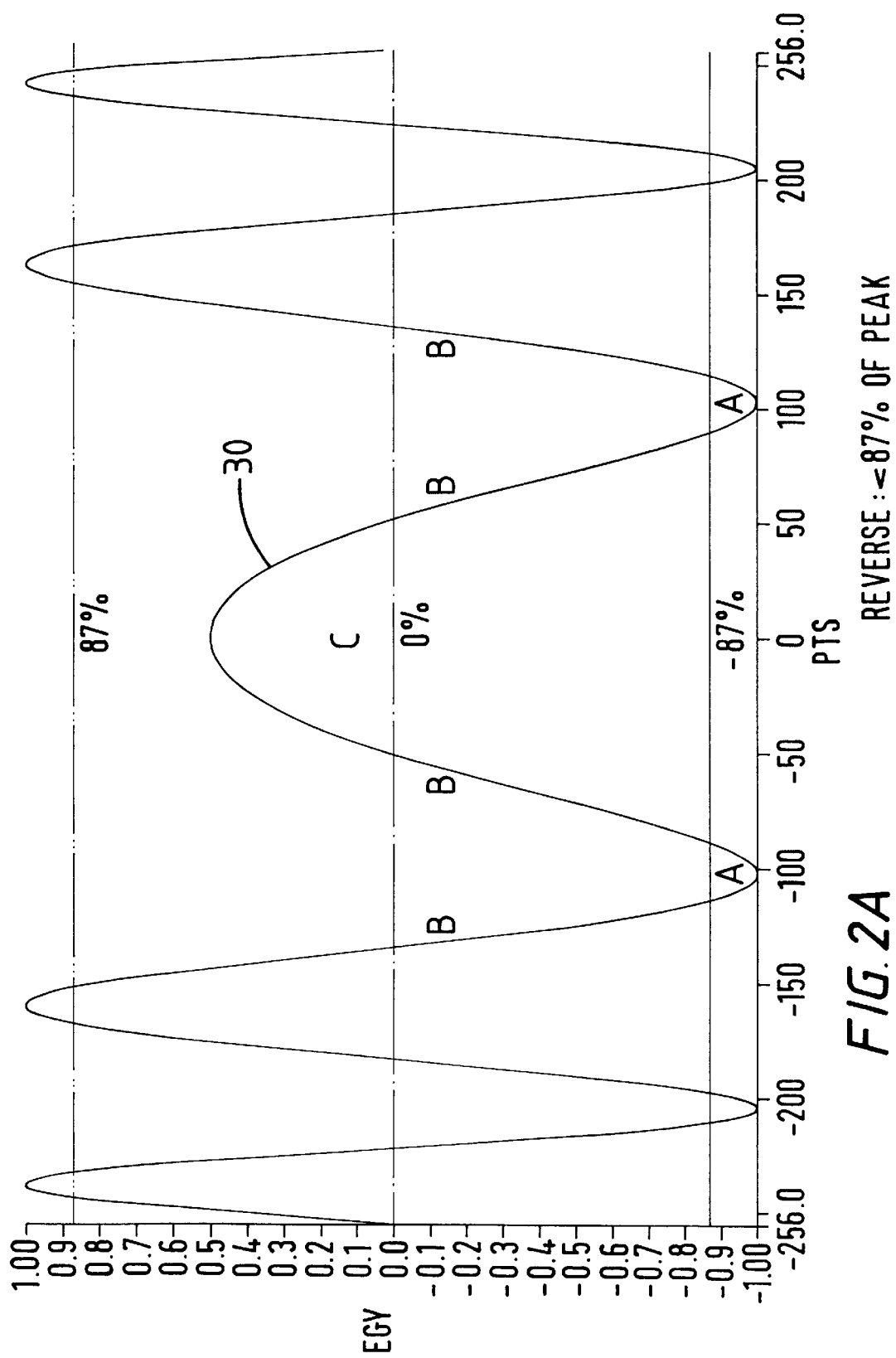
FIGS. 2A to 2C are waveform diagrams illustrating the operation of the present invention.

Referring to FIG. 1 apparatus for processing an interferogram signal and a reference signal in a Michelson type interferometer includes a first RC resistance-capacitor filter 10, which receives the interferogram signal and a second RC filter 11 which receives the reference fringe signal. The output of the RC filter 10 is fed to an analog-to-digital converter 12 which comprises a delta sigma converter. The delta sigma converter comprises a delta sigma modulator 12a and a digital filter 12b as shown in FIG. 1A. The output of the RC filter 11 is fed to a similar delta sigma converter 14. The delta sigma converter also comprises a delta sigma modulator 14a and a digital filter 14b as shown in FIG. 1B.

A high speed clock 15 provides output signals which are used to provide sampling signals to the delta sigma converters at the prescribed over sampling rate. It will be noted that this arrangement provides a fixed clock rate for each delta sigma converter. The output of the digital signal processor 18 is a digital representation of the interferogram at the zero crossing points of the interference fringes obtained by interpolation.

The optical path difference for each point in the output interferogram is known from the corresponding fringe count value, the fringe count being performed by the processor 18.

The following description concerns the operation of the digital signal processor (18) to provide fringe counting and importantly recognise changes in scan direction in order to maintain accurate information relating to the optical path difference at all times.

The fringe counting part of the algorithm operates by counting the zero crossings of the reference waveform based upon the data received from the ADC 14. As well as identifying and counting the zero crossings the reference waveform is also analysed in order to determine the position in the data where the scan changes direction. This requires a knowledge of the amplitude of the fringes and the value of any DC offset. These values can vary during an OPD scan.

The value of the DC offset can be determined by a number of methods and in the present arrangement a running record is kept of the current maximum and minimum values recognised in the fringe data. The DC offset (or fringe crossing threshold) is assumed to be midway between these two values. Sudden increases, except during start up, are treated as errors such as spikes. The advantage of using a DC offset which is derived from the observed maximum and minimum is that it is established rapidly on start up and can cater for significant changes in DC offset as the scan mechanism starts.

As previously indicated a critical factor in the present technique is identifying accurately a change in direction of the scan. This is important in maintaining an accurate fringe count at all time. The algorithm used by the digital signal processor achieves this by analysing the amplitude and timing of each half fringe of the reference waveform. Reversals are recognised in one of two ways and these are illustrated in FIGS. 2A and 2B.

The simplest situation is one in which the amplitude during a half cycle does not attain the amplitude of previous fringes. The situation is illustrated in FIG. 2A. In this case a reversal during the period can be identified unambiguously. The digital signal processor operates to determine this situation by recognising a half fringe cycle (30) in which the amplitude does not reach a threshold which is set to 87% (sine of 60°) of the previous fringe maximum (either positive or negative). The plus or minus 87% threshold is derived from the running maximum and minimum values of the fringes. FIG. 2A shows the situation when a positive half cycle fails to attain the 87% threshold. The operation is essentially the same for a negative half cycle.

Figure 2B:
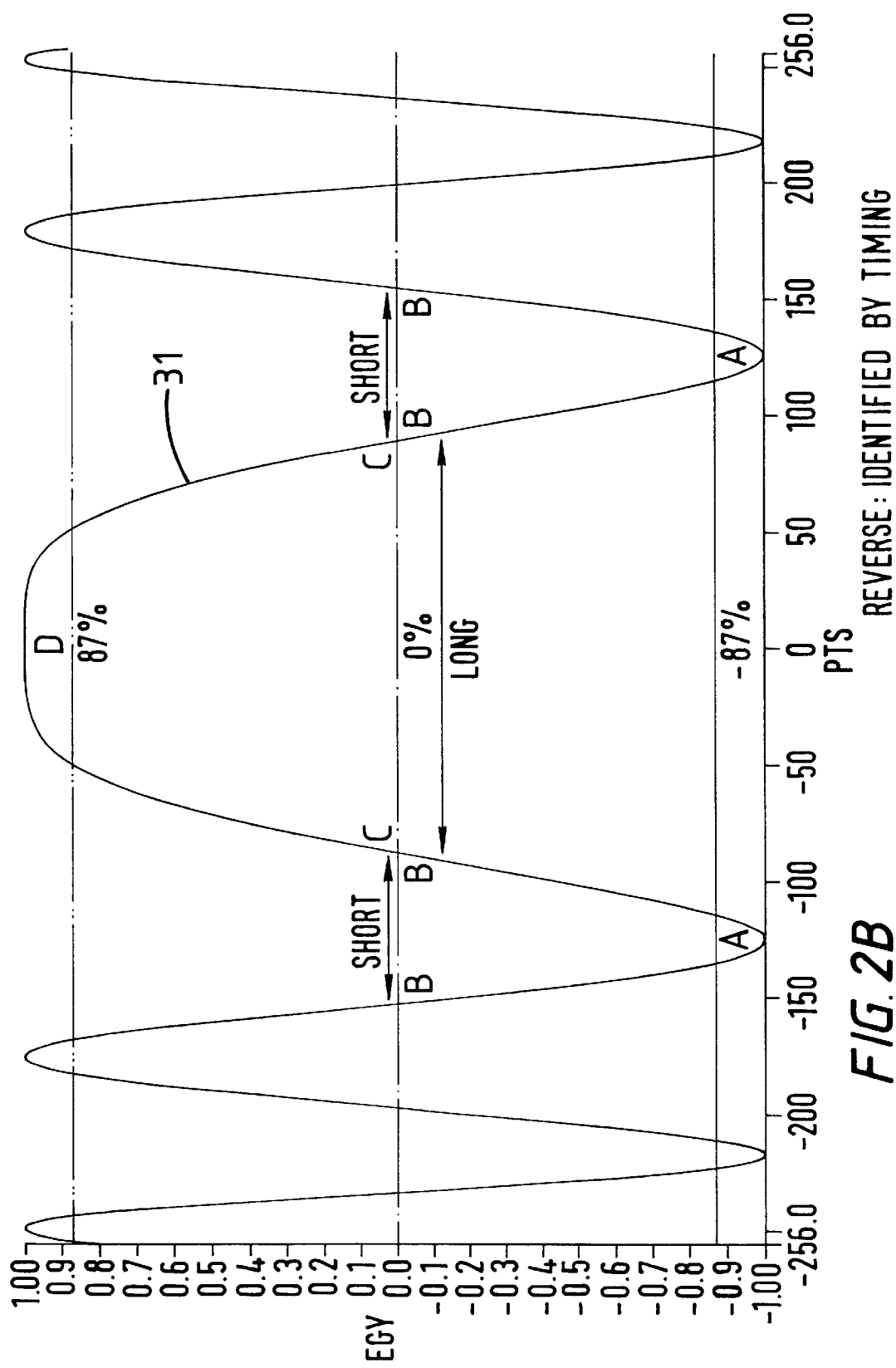

The second case is illustrated in FIG. 2B and is one in which the fringe maximum exceeds the threshold, but reversal is identified because the period of a half fringe (31) is significantly greater than the period of the two adjacent half fringe periods. The theoretical figure assuming constant acceleration and a threshold of 87% is that the half-fringe period will be a factor 2 or more greater than the period of the two fringes on either side of the point of reversal. The algorithm as implemented operates on a factor of 1.4. Thus when the algorithm identifies either of the two situations shown in FIGS. 2A and 2B the direction of counting of the fringes is reversed.

It will be appreciated from the above description that the reference fringe amplitude is being represented by a small number of states. In the described arrangement the system uses four states defined by the thresholds +87%, 0% and −87% shown in FIG. 2A. A reverse in the direction of scanning is identified when the processor recognises a particular sequence of states (FIG. 2A) or a particular time occurrence of states as illustrated in FIG. 2B.

The states describe the fringe amplitude. A complete fringe cycle (eg one positive zero crossing to the next) will go through a number of amplitude states, some of them twice. If there are three amplitude states, a non reversing fringe cycle will go through a sequence of four amplitude states (eg positive, mid-band, negative, mid-band). If there are four amplitude states, a non reversing fringe cycle will go through a sequence of six amplitude states (eg 0–87%, >87%, 0–87%, −87%–0, <−87%, −87%–0).

Figure 2C:
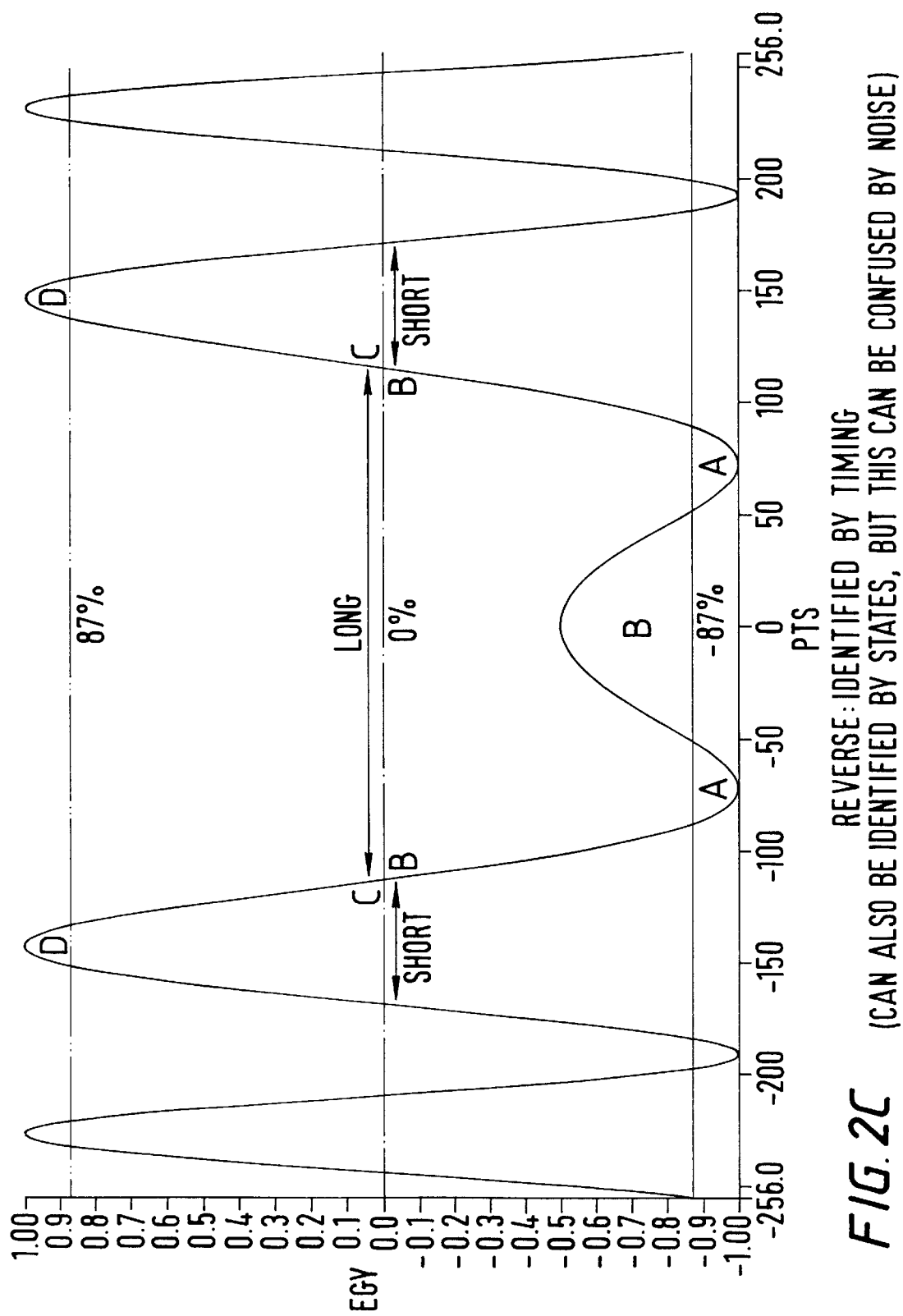

A further case is shown in FIG. 2C. In this situation a reversal is identified by the fringe amplitude dropping below 87% and not reaching 0%. However it should be noted that noise on the fringe signal during a non-reversing fringe cycle can lead to momentary changes of state and give a similar signature. This form of reversal can also be recognised by the half period of the interval marked "long" being significantly greater than each of the adjacent half periods marked "short" in FIG. 2C. Theoretically the ratio of half periods is greater than 3.4. Thus the preferred method is to identify this type of reversal by the method shown in FIG. 2B.

The fringe counting algorithm analyses each zero crossing period (that is to say a period of half a fringe) to identify reverses in scan/count direction. These processes include the following:
a) zero crossing detection and fringe counting (in the current direction)
b) determining if the peak amplitude in a half fringe exceeds the 87% threshold
c) maintaining the running peak maximum and minimum values of the fringe waveform
d) calculating the period of each half fringe by counting the number of ADC readings between zero crossings
e) identifying rapid acceleration or deceleration by comparing half fringe period
f) keeping a history of the most recent fringe periods
g) identifying spikes etc in the fringe data which could invalidate the count value
h) identifying positions of reversals
i) dealing with special situations such as multiple reverses due to jitter/noise.
j) initiating various internal operations when a particular fringe count is reached
k) providing absolute fringe count values for data output by the Digital Signal Processor or Microprocessor.

Figure 3:
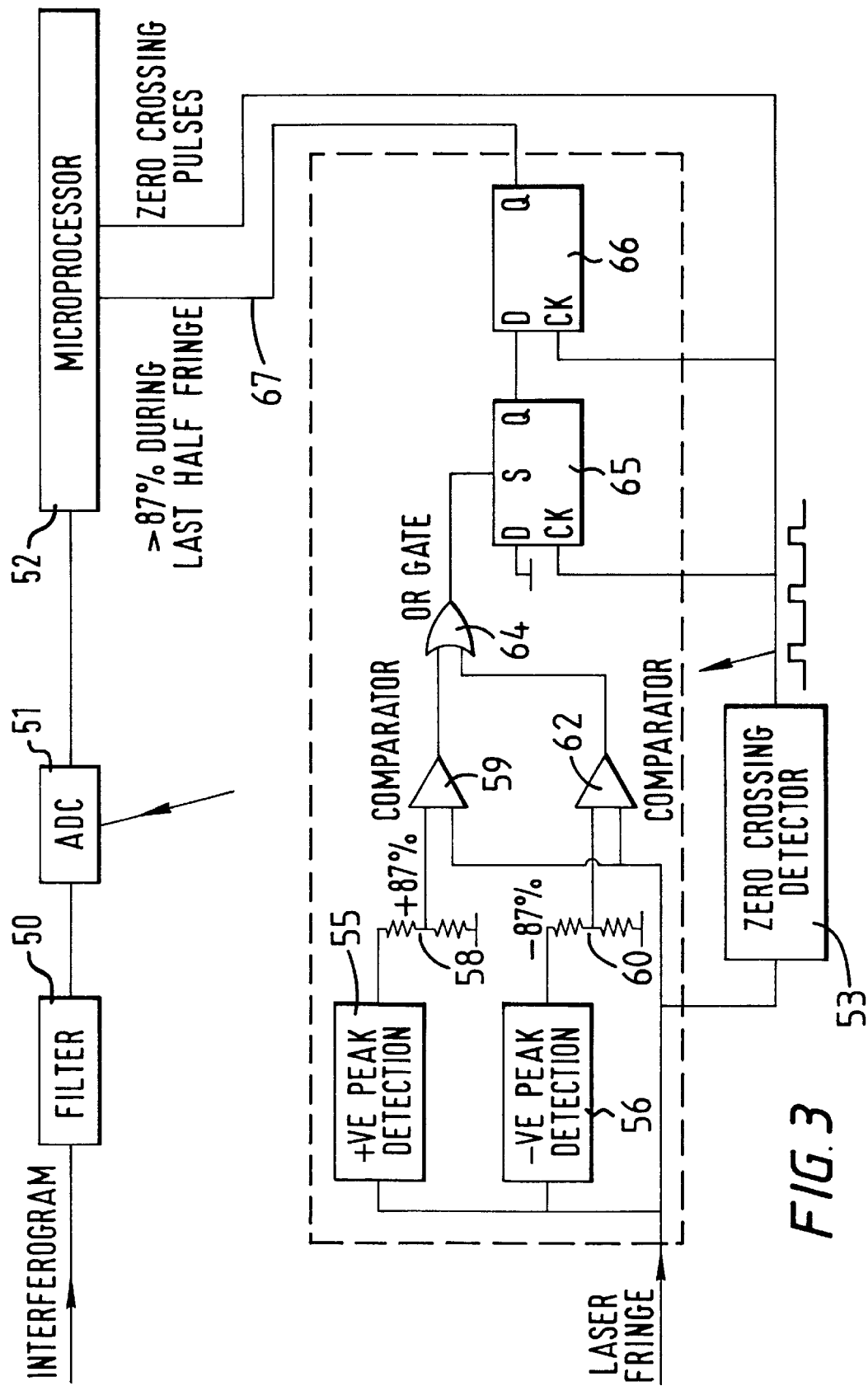
FIG. 3 is block schematic design illustrating an alternative implementation of the present invention, and, FIG. 4 is a flowchart of the steps performed by software when implementing the algorithm for identifying reversals in scan direction.

FIG. 1 shows an example of how the present invention can be implemented in a Michelson type interferometer in which both the interferogram channel and the reference fringe channel have an ADC for digitising the waveform. It is possible to implement the present invention in other types of arrangement and FIG. 3 illustrates one such arrangement. This shows how the invention can be implement in a device which does not have an ADC in the reference channel, eg an instrument of the type supplied by Perkin Elmer Ltd under the name PARAGON 500.

In this arrangement the interferogram signal is fed via a low pass filter 50, and a successive approximation ADC 51 to a microprocessor 52. Conventionally the fringe channel includes a zero crossing director 53 which feeds zero crossings pulses, to the microprocessor 52. The zero crossings pulses are also fed to the ADC 51 to act as sampling signals.

In the present modification the reference fringe channel is provided with a positive peak detection circuit 55 and a negative peak detection circuit 56 both of which receive as an input the reference fringe waveform. The output of the detection circuit 55 is connected to a divider 58 which generates a +87% threshold signal for a comparator 59 and the output of the detection circuit 56 is connected to a divider 60 which provides a −87% threshold signal for a comparator 62. The outputs of the comparators 59 and 62 are connected as inputs to an OR gate 64. The output of the OR gate 64 is connected to a D type latch 65 which in conjunction with a D type label 66 produces on line 67 signals which indicate whether the fringe amplitude reached the 87% threshold during the previous half cycle. The microprocessor 52 can process the zero crossing pulses and the signals on line 67 in a manner similar to that described with reference to FIGS. 1 and 2 in order to identify reversals in scan direction.

Figure 4:
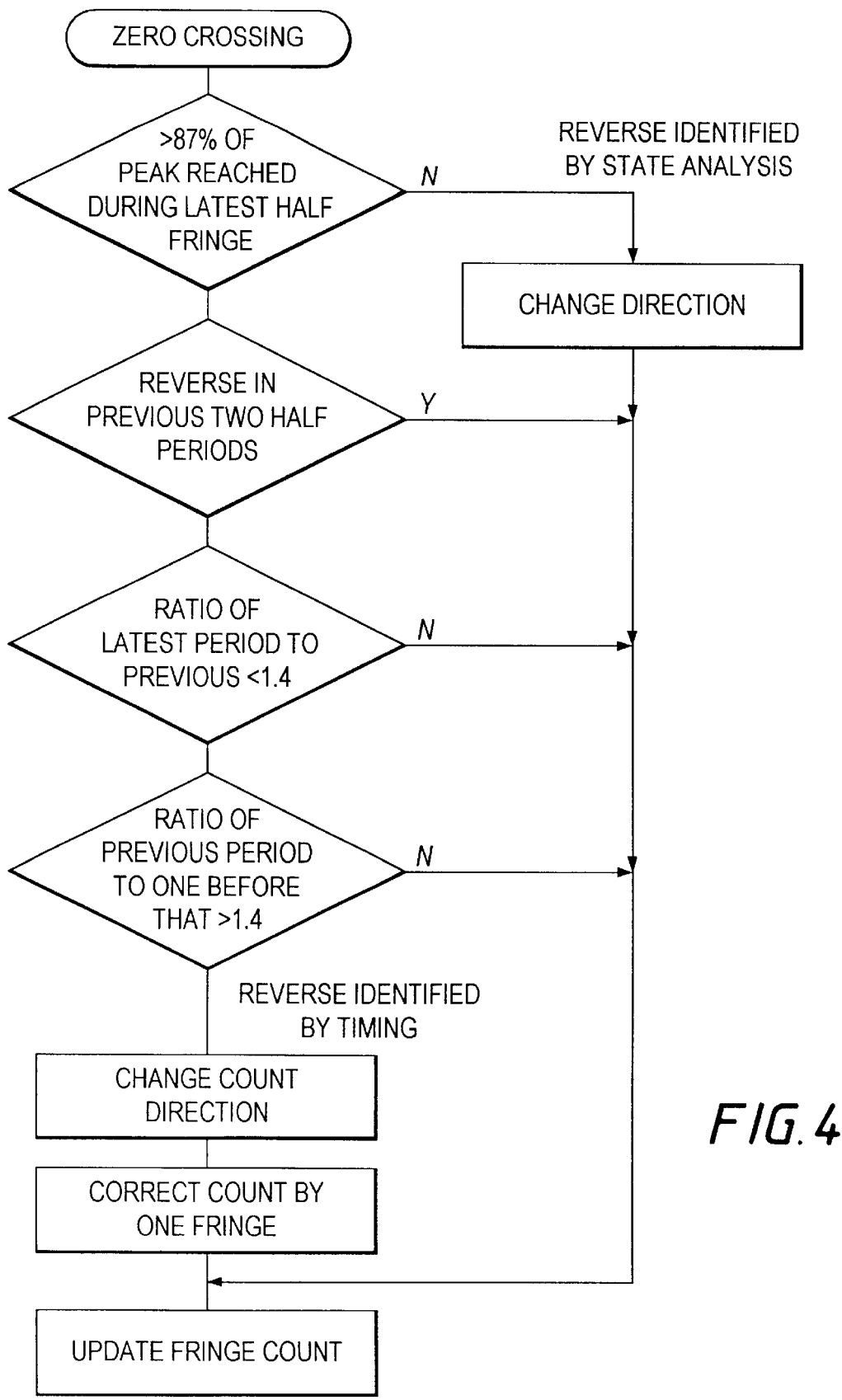

It is believed that the above description provides a competent engineer with sufficient information to write a program for implementing the described algorithm. The accompanying flowchart shown in FIG. 4 is included as additional material in this respect and this summarises the sequence of steps to be carried by software operating on the processes (18, 52) in implementing the algorithm.

What is claimed is:
1. Apparatus for processing the output signals of a Michelson type interferometer used in Fourier Transform spectroscopy which outputs include a waveform comprising an interferogram and a reference waveform representing interference fringes, said apparatus includes means for providing a digital representation of the reference waveform as three or more amplitude states of the reference waveform, and processing means for processing the digital representation of the reference waveform which processing includes monitoring the amplitude states of the reference waveform signal and recognizing a reversal of the scan direction by the occurrence or absence of the states.

2. Apparatus according to claim 1 wherein a reversal is recognised either by one or more sequences of amplitude states or by a given timing occurrence of the states.

3. Apparatus according to claim 1 wherein the fringe waveform is described in amplitude by four states in each fringe cycle.

4. Apparatus according to claim 1 wherein a reversal is recognized when the monitored states indicate that the amplitude during the fringe half cycle has failed to attain a predetermined proportion of the maximum value of that of preceding fringes.

5. Apparatus according to claim 1, wherein a reversal of scan direction is recognised by identifying either a failure of the fringe signal during a half cycle to obtain a given percentage of the amplitude of preceding fringes, or by recognising a change in the timing of the fringes.

6. Apparatus according to claim 1, wherein the monitoring comprises monitoring the amplitude of each half fringe and monitoring the time occurrence of each half cycle and a reversal is recognised either by a failure of the fringe signal during a half cycle to attain a given percentage of the amplitude of preceding fringes, or by a change in the interval between successive half cycle.

7. Apparatus according to claim 1 wherein the digital representation of the reference fringe waveform is generated by analogue-to-digital converter sampled at constant time intervals.

8. Apparatus according to claim 1 wherein the digital signal processor performs fringe counts by counting instants at which the amplitude of the reference waveform attain a predetermined value.

9. Apparatus according to claim 3, wherein the digital signal processor performs fringe counting by counting zero crossings of the reference waveform.

10. The apparatus of claim 1, further comprising means for providing a digital representation of the interferogram waveform.

11. A method of processing the output signals of a Michelson type interferometer which outputs include an interferogram and a reference waveform representing interference fringes, said method comprising providing a digital representation of the reference waveform as three or more amplitude states of the reference waveform and processing the digital representation using a digital signal processor said processing including monitoring the amplitude states of the reference waveform and recognizing a reversal of the scan direction by the occurrence or absence of the states.

12. A method according to claim 11 wherein a reversal is recognised by one or more sequences of amplitude states or by a given timing occurrence of the states.

13. A method according to claim 11 wherein the fringe waveform is described in amplitude by four states in each fringe cycle.

14. A method according to claim 11 wherein a reversal is recognised when the monitored states indicate that the amplitude during a fringe half cycle has failed to attain a predetermined proportion of the maximum value of that of the preceding fringes.

15. A method according to claim 11, wherein said monitoring comprises monitoring both the amplitude and time occurrence of each half fringe and recognising a reversal either as a failure of the amplitude of a half fringe to attain a given percentage of the amplitude of preceding fringes or as a change in the time interval between successive half fringes.

16. A method according to claim 11 including the step of processing the digital representation of the reference waveform to identify zero crossings of that waveform and counting the fringes of the reference waveform by counting said zero crossings.

17. The method of claim 11, further comprising providing a digital representation of the interferogram waveform.

* * * * *